H. F. ANSTINE.
COLLAR OPENER.
APPLICATION FILED MAY 19, 1915.
1,177,590.
Patented Apr. 4, 1916.
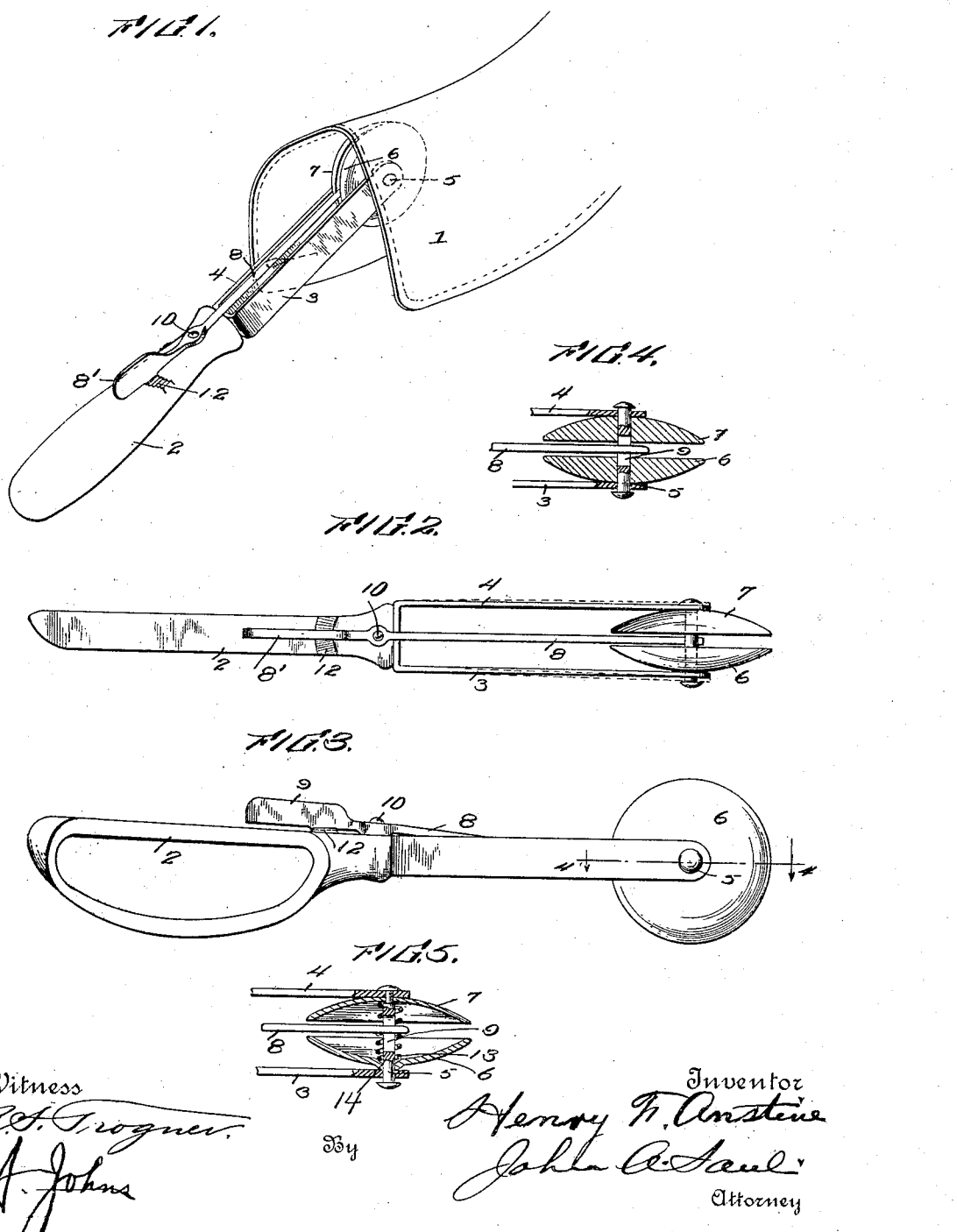

UNITED STATES PATENT OFFICE.

HENRY F. ANSTINE, OF WASHINGTON, DISTRICT OF COLUMBIA.

COLLAR-OPENER.

1,177,590.

Specification of Letters Patent.

Patented Apr. 4, 1916.

Application filed May 19, 1915. Serial No. 29,085.

*To all whom it may concern:*

Be it known that I, HENRY F. ANSTINE, a citizen of the United States, residing at Washington, in the District of Columbia, have invented certain new and useful Improvements in Collar-Openers, of which the following is a specification.

My invention relates to collar openers or expanders, for the purpose of spreading and smoothing the interior of the collar, so that a four-in-hand or the like tie may be slid within the folds of the same and adjusted with facility, and thus the great strain caused by tugging at the tie and consequent breaking and tearing of buttonholes, etc., may be obviated.

A further object of the invention is to make a cheap, neat, durable, and easily manufactured device, that will be sightly, and will occupy but little space while acting as a useful adjunct to the usual toilet articles.

In the drawings forming a part of this specification, and in which like symbols of reference represent corresponding parts in the several views of the same:—Figure 1 is a perspective view of the preferred form of my device, as the same appears in operation; Fig. 2 is a longitudinal plan view of the same; Fig. 3 is a modification of the invention; Fig. 4 a sectional view, broken-away, of the disks or rollers; and, Fig. 5 a sectional view, showing the disks employed in the modified form of the device.

In the drawings, the numeral 1 represents the collar as the device appears in the act of spreading the same; 2 the handle of the opener; 3 and 4 the forked spring arms of the same for carrying the disks, the same being connected to the handle and detachable therefrom, as illustrated in Figs. 1 and 2; and 5 the shaft upon which the disks 6 and 7 are journaled.

8 is an arm for spreading the disks, the same having its forward end sliding in a slot 9 formed in the shaft 5, and thus the disks may be adjusted to suit the spread desired.

10 is a pivot for the arm 8, and 8' a handle for manipulating the same on the rack 12 formed on the handle.

In the modification shown in Figs. 3 and 5 is illustrated a scissors-like handle instead of the form shown in Fig. 1, as some persons would likely prefer the same. I have also shown in the modification the disks having their inner portions concaved and a spring 13 on the shaft 5, the same exerting slight pressure on disk 6, but not exerting pressure sufficient to overcome the pressure of the arm 3, which has a spring action, and normally holds the disks together. In the modification, the disk 7 is shown as being held against longitudinal movement on the shaft by the shaft being reduced at its end. In my preferred form, also, disk 7 is not intended to move longitudinally, the play being through disk 6. There is a small depression 14 formed on the inner side of the disk 6 in the modification, the object of the same being to receive the end of the spring 13 and hold the same in its proper relation.

The operation of the device will be clear from the foregoing description.

Turn-over collars are very hard, as is well-known, in manipulating ties in the same, due partly to the fact that the sides are closely pressed together and partly to the fact that the surface is rough. My invention not only smooths but opens the two sides of the collar any desired distance, by simply running the same between the folds.

Having now fully described my invention, what I claim as new, and desire to protect by Letters Patent, is:—

1. A collar opener, comprising a handle formed with a forked end, and means connected with said forked end to traverse and spread the collar.

2. A collar opener, comprising a handle formed with resilient arms at one end, and a wheel formed of sections adapted to be adjusted laterally.

3. A collar opener, having a handle, a detachable forked member connected with the same, expansible disks carried by the arms of said member, and an arm connected with the handle and extending between the disks to manipulate the same.

4. A collar opener, comprising a handle having a resilient forked member, a sectional disk supported between the arms of said member, a shaft upon which the disk is journaled, a perforation or slot in the shaft, and an arm extending from the handle and working in the slot, so that the disk may be expanded.

In testimony whereof I affix my signature in presence of two witnesses.

HENRY F. ANSTINE.

Witnesses:
  LLOYD A. DOUGLASS,
  ESTHER M. JOHNSON.